United States Patent [19]
Okamura et al.

[11] Patent Number: 5,247,126
[45] Date of Patent: Sep. 21, 1993

[54] IMAGE REPRODUCING APPARATUS, IMAGE INFORMATION RECORDING MEDIUM, AND MUSICAL ACCOMPANIMENT PLAYING APPARATUS

[75] Inventors: Masahiro Okamura; Masuhiro Sato; Naoto Inaba; Yoshiyuki Akiba; Toshiki Nakai, all of Tokyo, Japan

[73] Assignee: Pioneer Electric Corporation, Tokyo, Japan

[21] Appl. No.: 797,543

[22] Filed: Nov. 25, 1991

[30] Foreign Application Priority Data

Nov. 27, 1990 [JP] Japan ................. 2-324707

[51] Int. Cl.$^5$ .................. G09B 15/04; G10H 1/08; G10H 1/36
[52] U.S. Cl. ...................... 84/609; 84/625; 84/634; 84/645; 84/477 R; 358/335
[58] Field of Search ............. 84/453, 462, 464 R, 84/464 A, 477 R, 478, 601–603, 609–614, 622–625, 634–638, 645, DIG. 6, DIG. 29; 358/335, 342; 360/32, 79

[56] References Cited

U.S. PATENT DOCUMENTS

| | | | |
|---|---|---|---|
| 4,215,343 | 7/1980 | Ejiri et al. | 84/DIG. 6 |
| 4,519,008 | 5/1985 | Takenouchi et al. | 358/335 X |
| 4,905,094 | 2/1990 | Pocock et al. | 358/342 |
| 5,005,459 | 4/1991 | Adachi et al. | 84/478 X |
| 5,046,004 | 9/1991 | Tsumura et al. | 84/601 X |
| 5,048,390 | 9/1991 | Adachi et al. | 84/464 R |
| 5,062,097 | 10/1991 | Kumaoka | 84/645 X |
| 5,127,303 | 7/1992 | Tsumura et al. | 84/601 X |
| 5,131,311 | 7/1992 | Murakami et al. | 84/601 X |

Primary Examiner—Stanely J. Witkowski
Attorney, Agent, or Firm—Kane, Dalsimer, Sullivan, Kurucz, Levy, Eisele and Richard

[57] ABSTRACT

In an image reproducing apparatus, a music information reproducing unit reproduces musical information, lyrics information or still picture information from a music information recording medium on which the musical information, the lyrics information or the still picture information relating to a plurality of music pieces are recorded, and an image information reproducing unit retrieves moving picture information in a predetermined order in correspondence with respective music pieces in the music information recording medium from an image information recording medium on which moving picture information divided into a plurality of moving picture information segments is recorded, and reproducing said picture information segments.

12 Claims, 19 Drawing Sheets

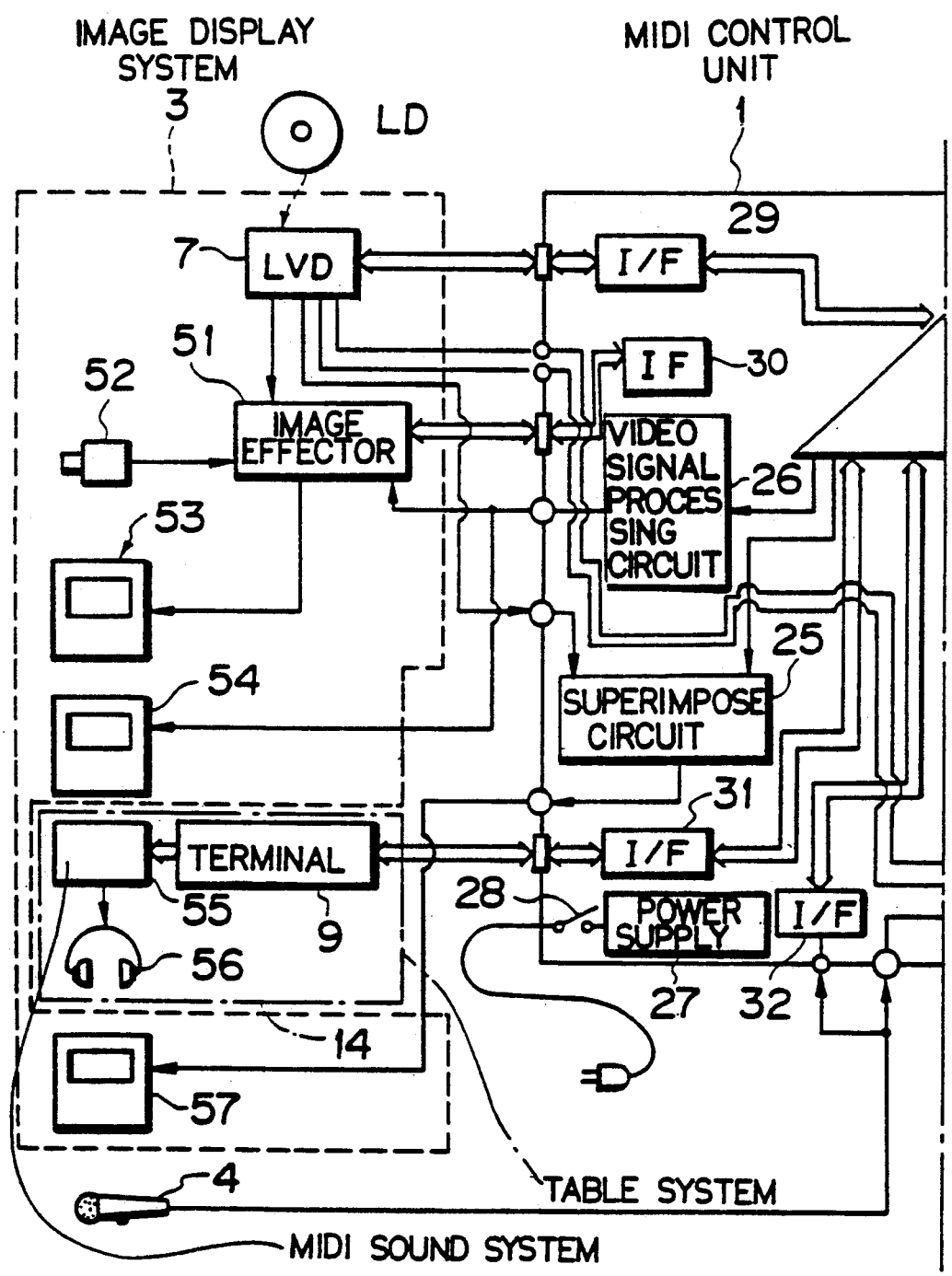

FIG.11

| BYTE | DATA | |
|---|---|---|
| 1 | Status Byte | |
| 2~5 | Track Length | } NF16: NF61, NF62 |
| 6~n | Control Command Data | NF71 |
| n+1~n+2 | Track End Data | } NF17: NF71, NF72 |

FIG.13

| B | R | G | COLOR |
|---|---|---|-------|
| O | O | O | BLACK |
| O | A | A | MUD YELLOW |
| O | A | F | OLIVE COLOR |
| A | O | F | YOUNG GRASS COLOR |
| A | A | A | GRAY |
| A | A | F | BROWNISH GREEN |
| A | F | A | ROSE |
| F | O | F | BLUE |
| F | A | O | VIOLET |
| F | F | O | PURPLE |
| F | F | F | WHITE |

FIG.15

| MUSICAL COMPOSI- TION NO. | TITLE OF MUSICAL COMPOSI- TION | LYRICS WRITER MUSICAL COMPOSER | NAME OF SINGER | LYRICS FOR RETRIEVAL |
|---|---|---|---|---|
| 01 | ○○○○ ○○ | ○○○○ ○○○○ | ○○○○ ○○ | ○○○ ○○ ⋯ |
| 02 | --- | --- | --- | --- |
| --- | --- | --- | --- | --- |
| --- | --- | --- | --- | --- |
| n | --- | --- | --- | --- |

FIG. 16

| RESERVATION NO. | NAME OF PERSON WHO MAKES RESERVATION | TITLE OF MUSICAL COMPOSITION |
|---|---|---|
| 01 | ○○○○○ | ○○○ |
| 02 | ○○○○○ | ○○○ |
| --- | --- | --- |
| --- | --- | --- |
| n | --- | --- |

IMAGE REPRODUCING APPARATUS, IMAGE INFORMATION RECORDING MEDIUM, AND MUSICAL ACCOMPANIMENT PLAYING APPARATUS

BACKGROUND OF THE INVENTION

This invention relates to a so called musical accompaniment playing information memory medium, an image information memory medium and a musical accompaniment playing apparatus or "KARAOKE" apparatus, and more particularly to a musical accompaniment playing information memory medium, and a musical accompaniment playing apparatus using a MIDI (Musical Instrument Digital Interface) standard.

Hitherto, as the musical accompaniment playing apparatus, there are known the playing apparatus in the form of a laser video disk and the playing apparatus in the form of a compact disk.

The apparatus for reproducing musical accompaniment information in the form of a laser video disk (LVD) comprises a LVD automatic changer for accommodating therein a plurality of laser video disks serving as the musical accompaniment information recording medium and reproducing them, a commander for controlling the LVD automatic changer to allow it to select a desired laser video disk in the LVD automatic changer by a request inputted from a control unit, an amplifier and a speaker for outputting a reproduced audio signal as a sound, an image display unit for displaying a reproduced image signal as an image, and a microphone for changing a voice sung to an audio signal to output it to the amplifier. The amplifier mixes the audio signal from the LVD automatic changer and the audio signal of the voice sung from the microphone to output a mixed signal to the speaker.

On the other hand, the apparatus for reproducing musical accompaniment information in the form of a compact disk (CD) comprises a CD automatic changer for accommodating therein a plurality of CDs and reproducing them, a commander for controlling the CD automatic changer to allow it to select a desired CD in the CD automatic changer by a request inputted form a control unit, an amplifier and a speaker for outputting a reproduced audio signal as a sound, a graphic decoder for converting graphic data reproduced from subcode data in the CD to an image signal, a graphic display unit for displaying the image signal as an image, and a microphone for changing a voice sung to an audio signal to output it to the amplifier. The amplifier mixes the audio signal from the CD automatic changer and the audio signal of the voice sung from the microphone to output a mixed signal to the speaker.

By constituting the musical accompaniment playing apparatus in this way, a singer can sing a song with a musical accompaniment, and can enjoy, at the same time, a corresponding image.

However, in the musical accompaniment playing information memory media and musical accompaniment playing apparatuses in the conventional forms, in the case of the laser video disk, since the same image is displayed with respect to one music, if that music is a hit song, it is played many times a day, thereby eventually lacking in freshness. In the case of an image by the subcode graphic of the compact disk, there is similar drawback. In this case, since such an image is not a real image, a musical accompaniment playing is further wearisome. Further, there is also known a form in which the compact disk and the laser video disk are combined to give an ability of selecting, every genre, a desired image as an image from the laser video disk thus to reproduce a moving picture. Even in this case, however, since selection of images is made from images of about 20 to 30 musics recorded or collected in the laser video disk, there is the possibility that the same image may be displayed for different musics. As a result, there is a limit in freshness. On the other hand, there is also known a form in which several kinds of still pictures are reproduced for one music. However, such a still picture displaying is visually inferior to the moving picture displaying.

SUMMARY OF THE INVENTION

An object of the present invention is to provide an image reproducing apparatus and a musical accompaniment playing apparatus which can display a background image in conformity with the content of a musical accompaniment and free from banality, and an image information recording medium used for such a musical accompaniment playing apparatus.

According to one preferred aspect of the present invention, there is provided an image reproducing apparatus comprising:

a music information reproducing unit for reproducing musical information, lyrics information or still picture information from a music information recording medium on which the musical information, the lyrics information or said still picture information relating to a plurality of music pieces are recorded; and an image information reproducing unit for retrieving moving picture information in a predetermined order in correspondence with respective music pieces in the music information recording medium from an image information recording medium on which moving picture information divided into a plurality of moving picture information segments is recorded, and reproducing the moving picture information segments.

According to another preferred aspect of the present invention, there is provided an image reproducing apparatus comprising:

a music information reproducer for reproducing musical information, lyrics information or still picture information from a music information recording medium on which said musical information, said lyrics information or the still picture information relating to a plurality of music pieces are recorded; and an image information reproducer for retrieving moving picture information in a predetermined order in correspondence with respective music pieces in the music information recording medium from an image information recording medium on which moving picture information divided into a plurality of moving picture information segments is recorded, and reproducing the moving picture information segments.

According to still another preferred aspect of the present invention, there is provided an image reproducing method comprising:

reproducing musical information, lyrics information or still picture information from a music information recording medium on which the musical information, the lyrics information or the still picture information relating to a plurality of music pieces are recorded; and retrieving moving picture information in a predetermined order in correspondence with respective music pieces in the music information recording medium from an image information recording medium on which moving picture information divided into a plurality of moving picture information segments is recorded, and reproducing the moving picture information segments.

According to still another aspect of the present invention, there is provided an image reproducing apparatus comprising:

a music information reproducing unit for reproducing musical information, lyrics information or still picture information from a music information recording medium on which the musical information, the lyrics information or the still picture information relating to a plurality of music pieces are recorded;

an image information reproducing unit for retrieving moving picture information in a predetermined order in correspondence with respective music pieces in the music information recording medium from an image information recording medium on which moving picture information divided into a plurality of moving picture information segments is recorded, and reproducing the moving picture information segments; and a control unit for controlling to output, as a still picture, a final moving picture information segment of an arbitrary moving picture information segments for a time period until retrieval of a moving picture information segments succeeding to the arbitrary moving picture information segments is finished and reproduction thereof is then started.

According to still another preferred aspect of the present invention, there is provided an image information recording medium reproduced by a musical accompaniment playing apparatus comprising:

a musical accompaniment information reproducing unit for reproducing MIDI sound source control information from a musical accompaniment information recording medium on which the MIDI sound source control information for controlling MIDI sound source unit to generate musical accompaniment information in conformity with a MIDI standard is stored;

the MIDI sound source unit for generating the musical accompaniment information by the MIDI sound source control information reproduced by the musical accompaniment information reproducing unit;

an acoustoelectric transducer for transforming a voice sung by a singer to an electric signal to output it as voice information;

a mixing unit for mixing the musical accompaniment information and the voice information to output it as mixed musical information;

a sound output unit for transforming the mixed musical information to sound to output it;

an image information reproducing unit for reproducing image information from an image information recording medium on which image information is recorded;

an image display unit for displaying an image according to the reproduced image information; and a control unit for controlling the output timings of sound outputted from the sound output unit and an image displayed by the image display unit;

the image information recording unit comprising an image information segment recording area for storing therein a plurality of image information segments relating to a plurality of images which can be displayed in conformity with the musical accompaniment information and retrieval address information segments for retrieving the individual image information segments.

In a musical accompaniment playing apparatus which comprises:

a musical accompaniment information reproducing unit for reproducing MIDI sound source control information from a musical accompaniment information recording medium comprising a MIDI source control information recording area including an image control information recording area for storing the MIDI sound source control information for controlling MIDI sound source unit to generate musical accompaniment information in conformity with a MIDI standard and for storing image control information for allowing the control unit to control the output timing of an image display;

the said MIDI sound source unit for generating the musical accompaniment information by the MIDI sound source control information reproduced by the musical accompaniment information reproducing unit;

an acoustoelectric transducer for transforming a voice sung by a singer to an electric signal to output it as voice information;

a mixing unit for mixing the musical accompaniment information and the voice information to output it as mixed musical information;

a sound output unit for transforming the mixed musical information to sound to output it;

an image information reproducing unit for reproducing image information from the image information recording medium described hereinabove;

an image display unit for displaying an image of the reproduced image information; and a control unit for controlling the output timings of sound outputted from the sound output means and an image displayed by the image display means;

the control unit may control to allow the image information reproducing unit to retrieve, from the internal portion of the image information recording medium, the image information segments in conformity with the musical accompaniment information on the basis of the image control information to cause the image display means to display an image of the image information segments, and to allow the image display means to display, as a still image, a final image information segment of an arbitrary image information segments for a time period until an image information segments succeeding to the arbitrary image information segments are retrieved and a first image thereof is then displayed.

BRIEF DESCRIPTION OF THE DRAWINGS

FIG. 11 is a view showing the detailed configuration of the control command track in FIG. 10, FIGS. 12(A)-12(C) are views showing the detailed configuration of the lyrics file in FIG. 10, FIG. 13 is a view showing an example of the color code by the lyrics file, FIG. 15 is a view showing a display example of the Table, FIG. 16 is a view showing an example of a display of the reservation state of a music.

DETAILED DESCRIPTION OF THE PREFERRED EMBODIMENTS

Prior to the description of preferred embodiments of the present invention, the problems with conventional apparatuses for reproducing musical accompaniment information will be first described with reference to the attached drawings.

Figure 17:
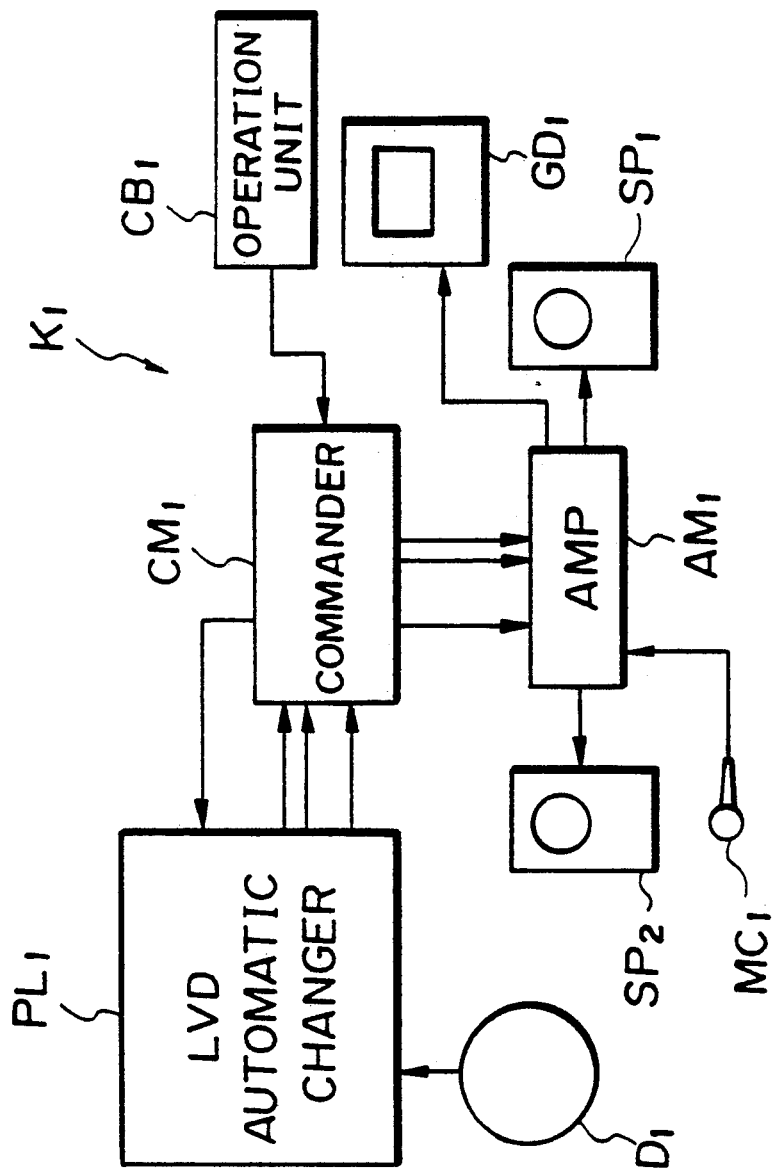
FIGS. 17 and 18 are views showing examples of conventional musical accompaniment playing apparatuses.

FIG. 17 is a block diagram showing the configuration of an apparatus called a LVD musical accompaniment playing apparatus. This LVD musical accompaniment playing apparatus K1 comprises a LVD automatic changer PL1 for accommodating therein a plurality of laser video disks D1 serving as a musical accompaniment playing information memory medium and reproducing them, a commander CM1 for controlling the LVD automatic changer PL1 to allow it to select a desired laser video disk D1 in the LVD automatic changer PL1 by an request inputted from a operation unit CB1, an amplifier AM1 and speakers SP1 and SP2 for outputting as sound a reproduced audio signal, an image display unit GD1 for displaying a reproduced image signal as an image, and a microphone MC1 for changing a voice sung to an audio signal to output it to the amplifier AM1. The amplifier AM1 mixes an audio signal from the LVD automatic changer PL1 which is a musical signal from the so called musical accompaniment player and an audio signal of a voice sung from the microphone MC1 to output it to the speakers SP1 and SP2. It is to be noted that the commander CM1 may ordinarily include the operation unit CB1.

Figure 18:
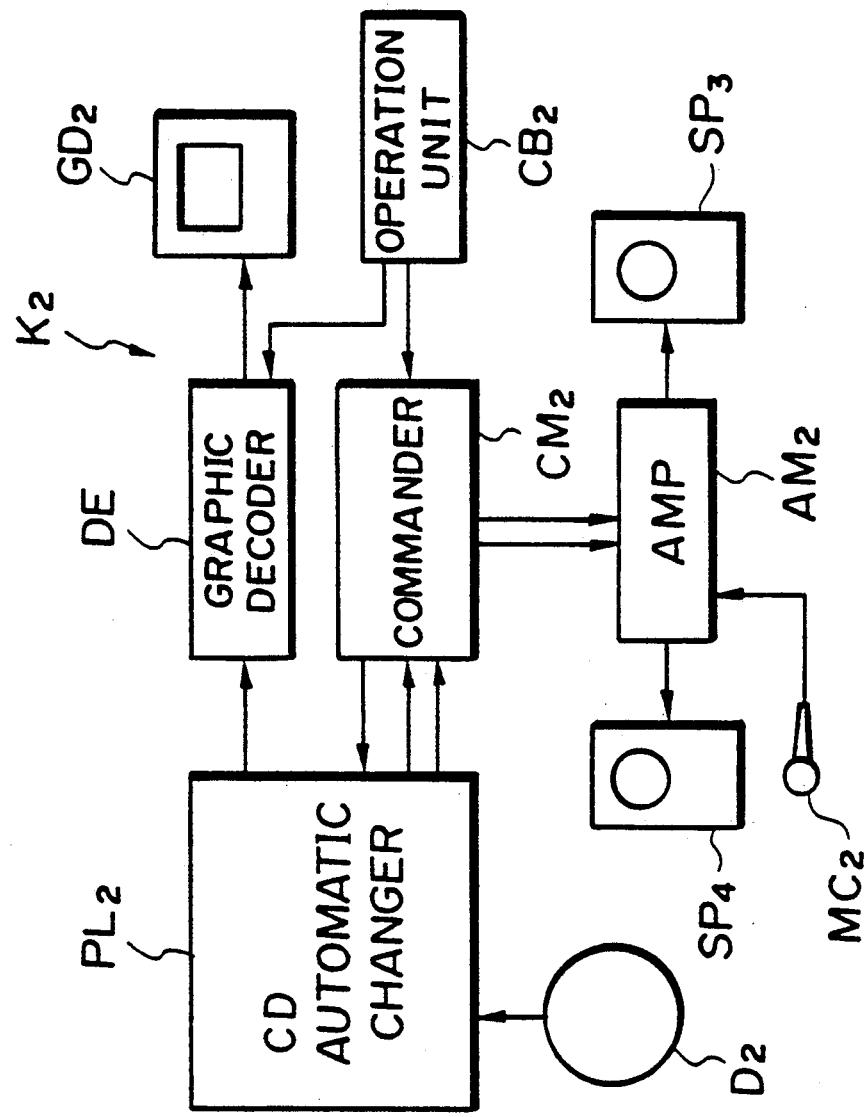

Further, FIG. 18 is a block diagram showing the configuration of an apparatus called a CD musical accompaniment playing apparatus K2. This musical accompaniment playing apparatus K2 comprises a CD automatic changer PL2 for accommodating therein a plurality of compact disks D2 serving as a musical accompaniment playing information memory medium and reproducing them, a commander CM2 for controlling the CD automatic changer PL2 to allow it to select a desired compact disk D2 in the CD automatic changer PL2 by a request inputted from the operation unit CB2, an amplifier AM2 and speakers SP3 and SP4 for outputting a reproduced audio signal as sound, a graphic decoder DE for converting graphic data reproduced from the subcode data in the compact disk D2 to an image signal, an image display unit GD2 for displaying this image signal as an image, and a microphone MC2 for changing a voice sung to an audio signal to output it to the amplifier AM2. The amplifier AM2 mixes an audio signal from the CD automatic changer PL2 which is a musical signal from the so called musical accompaniment player and an audio signal of a voice sung from the microphone MC2 to output it to the speakers SP3 and SP4. It is to be noted that the commander CM2 may ordinarily include the operation unit CB2 and the graphic decoder DE.

By constituting the musical accompaniment playing apparatus in this way, a singer can sing a song with music from a musical accompaniment player as a musical accompaniment, and can enjoy, at the same time, a corresponding image.

However, in the musical accompaniment playing information memory media and musical accompaniment playing apparatuses in the conventional forms, in the case of the laser video disk, since the same image is displayed with respect to one music, if that music is a hit song, it is played many times a day, lacking in freshness. In the case of an image by the subcode graphic of the compact disk, there is similar drawback. In this case, since such an image is not a real image, a musical accompaniment playing is further wearisome. Further, there is also known a form in which the compact disk and the laser video disk are combined to give an ability of selecting, every genre, a desired image as an image from the laser video disk thus to reproduce a moving picture. Even in this case, however, since selection of images is made from images of about 20 to 30 musics recorded or collected in the laser video disk, there is the possibility that the same image may be displayed for different musics. As a result, there is a limit in freshness. On the other hand, there is also known a form in which several kinds of still pictures are reproduced for one music. However, such a still picture displaying is visually inferior to the moving picture displaying.

Principle of the Invention

Figure 1:
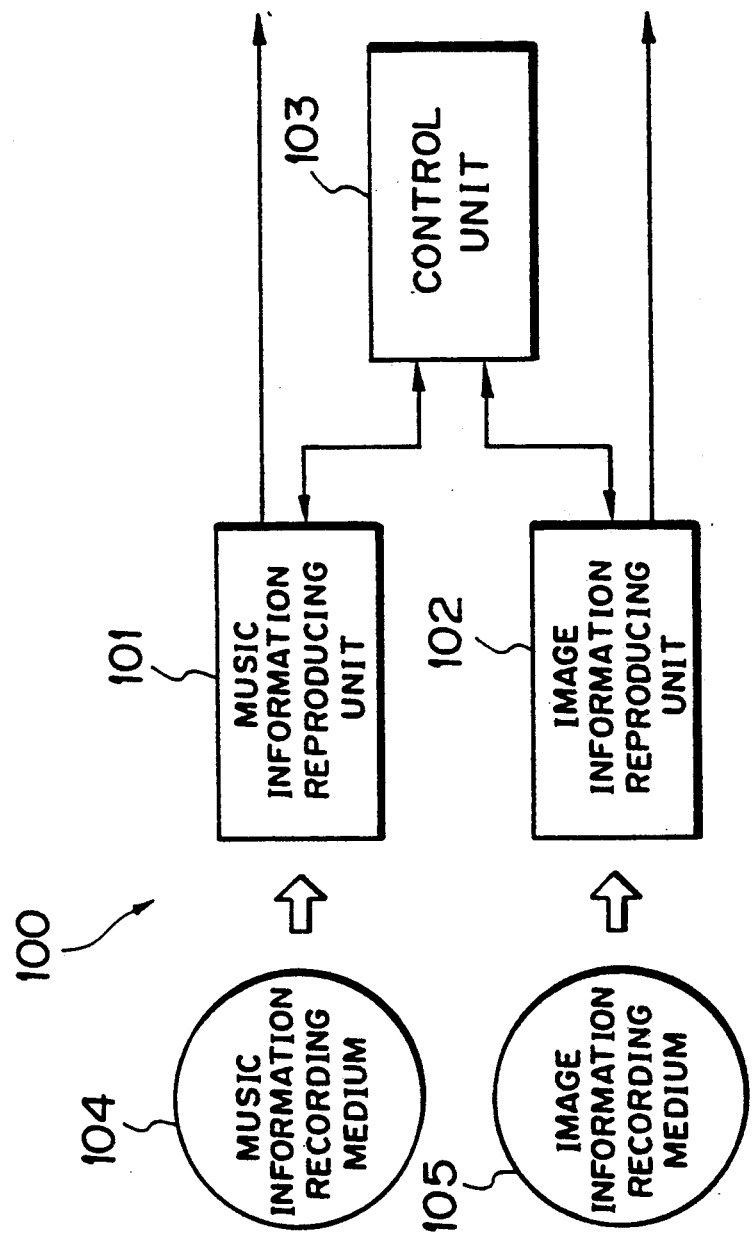
FIGS. 1, 2 and 3 are views for explaining the principle of the present invention.

In FIG. 1, an image reproducing apparatus 100 comprises a music information reproducing unit 101 for reproducing musical information, lyrics information or still picture information from a music information recording medium 104 on which the musical information, the lyrics information or the still picture information relating to a plurality of music pieces are stored; an image information reproducing unit 102 for reproducing moving picture information segments while retrieving them in a predetermined order in correspondence with respective music pieces in the music information recording medium 104 from an image information recording medium 105 on which moving picture information provided into a plurality of moving picture information segments is stored; and a control unit 103 for effecting a control to output, as a still picture, a final image of an arbitrary moving picture information segment for a time period until a moving picture information segment succeeding to said arbitrary moving picture information segment is retrieved and reproduction thereof is then started.

Figure 2:
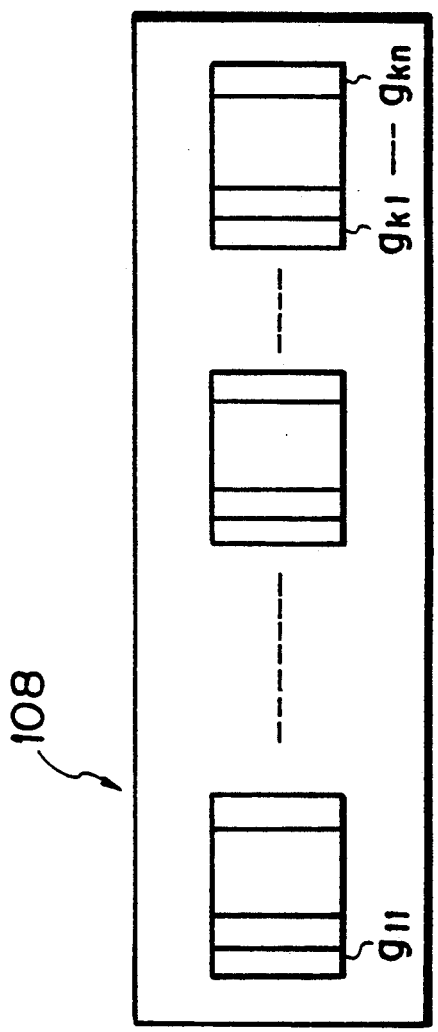

The invention shown in FIG. 2 is directed to an image information recording medium 108, as shown in FIG. 2, reproduced by a musical accompaniment playing apparatus comprising: a musical accompaniment playing information reproducing unit for reproducing MIDI sound source control information from a musical accompaniment information recording medium on which the MIDI sound source control information for controlling a MIDI sound source unit generating musical accompaniment information in conformity with a MIDI standard is stored; the MIDI sound source unit for generating the musical accompaniment playing information by the MIDI sound source control information reproduced by the musical accompaniment information reproducing unit; an acoustoelectric transducer for transforming a voice sung by a singer to an electric signal to output it as voice information; a mixing unit for mixing the musical accompaniment playing information and the voice information to output it as mixed musical information; a sound output means for transforming the mixed musical information to sound to output it; an image information reproducing unit for reproducing image information from an image information recording medium on which image information is stored, an image display unit for displaying an image of the reproduced image information, and a control unit for controlling the output timings of sound outputted from the sound output unit and an image displayed by the image display unit, wherein the image information recording medium comprises an image information segment recording area for storing therein a plurality of image information segments which can be displayed in conformity with the musical accompaniment information and retrieval address information segments for retrieving the individual image information segments.

Figure 3:
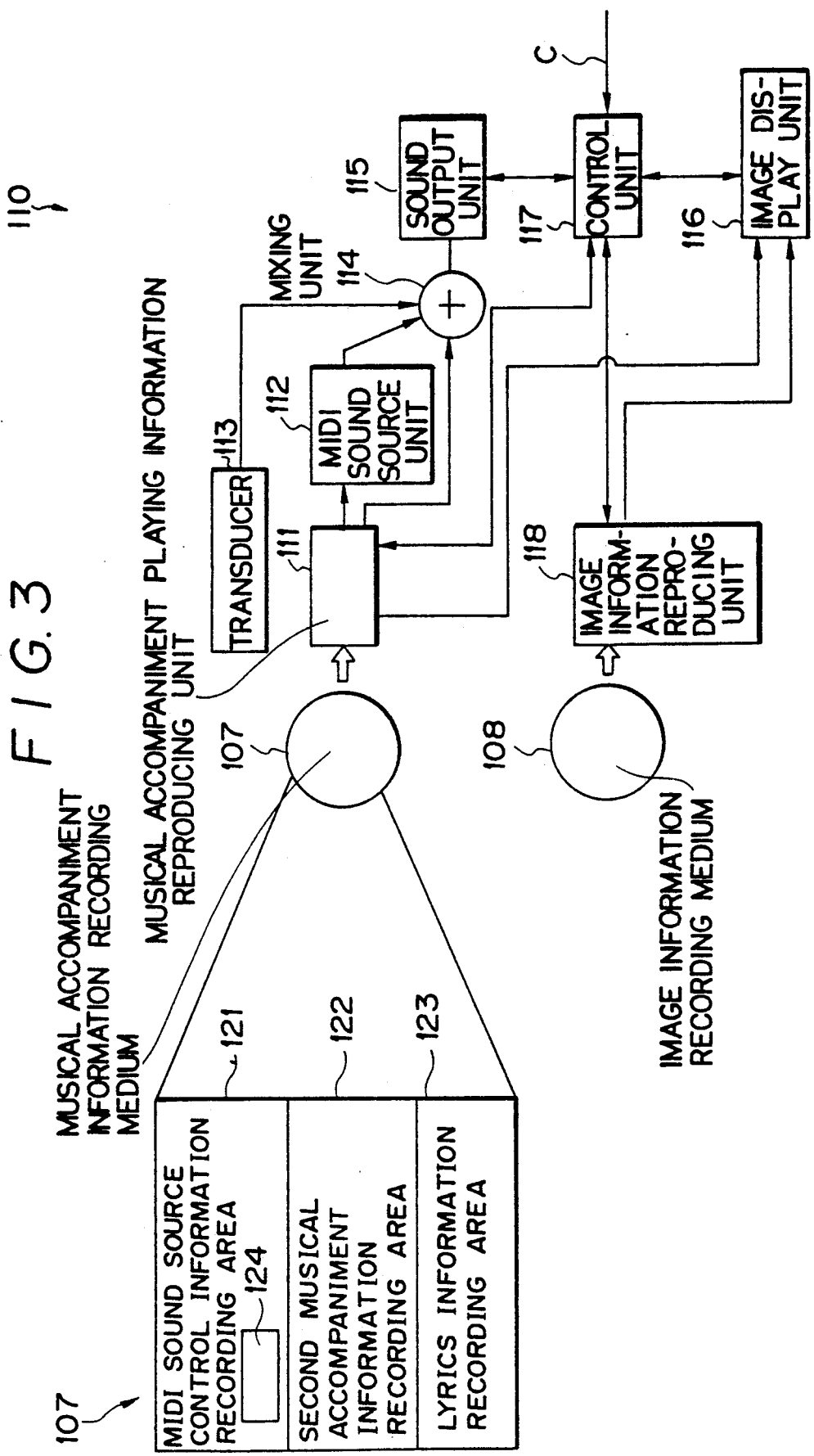

In FIG. 3, the invention is directed to a musical accompaniment playing apparatus comprising: a musical accompaniment playing information reproducing unit 111 for reproducing MIDI sound source control information from a musical accompaniment information recording medium comprising a MIDI sound source control information recording area 121 including an image control information recording area 124 for storing the MIDI sound source control information for controlling a MIDI sound source unit generating musical accompaniment playing information in conformity with a MIDI standard and for storing image control information for allowing the control unit to control the output timing of an image display; the MIDI sound source unit 112 for generating the musical accompaniment playing information by MIDI sound source control information reproduced by the musical accompaniment information reproducing means; an acoustoelectric transducer 113 for transforming a voice sung by a singer to an electric signal to output it as voice information; a mixing unit 114 for mixing the musical accompaniment playing information and the voice information to output it as mixed musical information; a sound output unit 115 for transforming the mixed sound information to sound to output it; an image information reproducing unit 118 for reproducing image information from the image information recording medium 108 described; an image display unit 116 for displaying an image of the reproduced image information; and a control unit 117 for controlling the output timings of sound outputted from the sound output unit 115 and an image displayed by the image display unit, wherein the control unit 117 effects a control to allow the image information reproducing unit 118 to retrieve, from the internal portion of the image information recording medium 108, the image information segments in conformity with the musical accompaniment information on the basis of the image control information to cause the image display unit 116 to display an image of the image information segments, and to allow the image display unit to display, as a still image, a final image of an arbitrary image information segment for a time period until an image information segment succeeding to the arbitrary image information is retrieved and an image thereof is then displayed.

In accordance with the present invention thus constructed, in the image reproducing apparatus 100, the image information reproducing unit 102 reproduces moving picture information segments while retrieving them in a predetermined order in correspondence with respective music pieces in the music information recording medium from the image information recording medium on which moving picture information divided into a plurality of moving picture information segments is stored, and the control unit 103 effects a control to output a final image of an arbitrary moving picture information segment for a time period until a moving picture information segment succeeding to the arbitrary moving picture information segment is retrieved and reproduction thereof is then started.

Accordingly, it is possible to output many kinds of combined images caused to become in correspondence with a large number of musics by less number of image information memory media, and there results less disagreement of feeling at the time of changing of image or scene.

Particularly, in the musical accompaniment playing apparatus 110, the control unit 117 effects a control to allow the image information reproducing unit 118 to retrieve, from the image information recording medium 108, image information segments $g_{11}$ to $g_{kn}$ in a manner caused to be in correspondence with the musical accompaniment playing information on the basis of the image control information stored in the musical accompaniment information recording medium 107. Further, the control unit 117 effects a control to allow the image display unit 116 to display images of the image information segments $g_{11}$ to $g_{kn}$. Thus, it is possible to construct many kinds of background images or images in which the majority is comprised of moving pictures by combination of image information segments, and to prevent banality of the background image. In addition, by an external operation command, a background image can be constructed according to selection of a singer. Thus, this musical accompaniment playing apparatus can cope with the customer's need.

Prior to the description of an embodiment of the present invention, the MIDI standard, the MIDI sound source, and the MIDI musical accompaniment playing format used in the present invention will be first described with reference to FIGS. 7 to 16.

MIDI standard, MIDI sound source, and MIDI musical accompaniment playing format

The MIDI (Musical Instrument Digital Interface) is the standard determined for permitting musical instruments such as synthesizer or electronic piano, etc. to be connected to each other to effect exchange of information therebetween.

Electronic instruments provided with a hardware based on the MIDI standard and having a function to carry out transmission and reception of a MIDI control signal serving as a musical instrument playing control signal in the form defined to support musical information are called MIDI equipments.

On disks such as CDs (Compact Disk), CD V (Video) or LVD (Laser Video Disk) including CD format digital sound, etc., or tapes such as DAT, etc., subcodes are recorded. There are subcodes of P, Q, R, S, T, U, V and W channels. The P and Q channels thereof are used for the purpose of effecting control of a disk player and display.

On the other hand, R to W channels are empty channels called user's bit. Various studies of application to graphic, sound or image, etc. are being conducted. The standard with respect to the graphic format has been already proposed.

Further, MIDI format signals may be recorded in the user's bit area. The standard therefor has been already proposed.

In this case, an approach may be employed to deliver an audio video signal reproduced by the disk player to the AV system to carry out audio visual operation of a program recorded on the disk, and an approach may be also employed to allow the AV system itself to have such a function, or to deliver playing program information to other MIDI equipments. Accordingly, various studies of application to construction of the AV system with realism or presence including electronic musical instruments, or preparation of educational software, etc. are being conducted.

The MIDI equipments play music in accordance with the musical instrument performance program formed by a MIDI signal obtained by converting MIDI format signals sequentially delivered from the disk player to serial signals.

The MIDI control signal delivered to the MIDI equipment is serial data of a transfer rate 31.25 [Kbaud], and 10 bits in total of 8 data bits, and one start bit and one stop bit of respective one bits constitute data corresponding to one unit.

Further, at least one status byte for designating the kind of data sent and the MIDI channel and one or two data bytes introduced by that status are combined to form a message serving as musical information. Accordingly, one message is comprises of 1 to 3 bytes, and a transfer time of 320 to 960 [μsec] is required for the transfer. A musical instrument playing program is formed by a series of messages.

Figure 7:
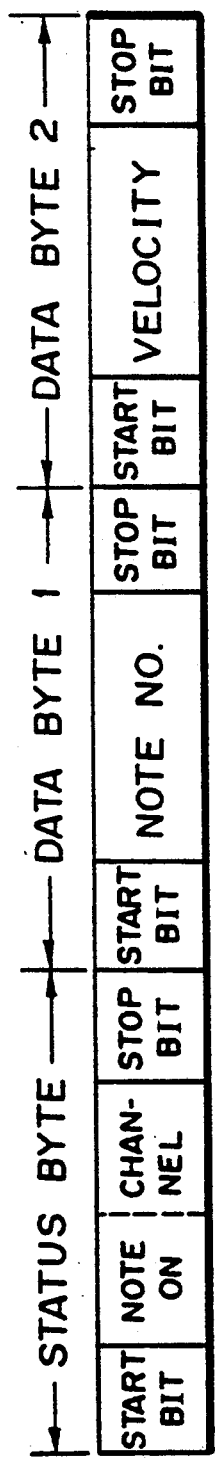

The configuration of a note on message which is one example of such a channel voice messages is shown in FIG. 7 as an example of such a message.

Figure 8:
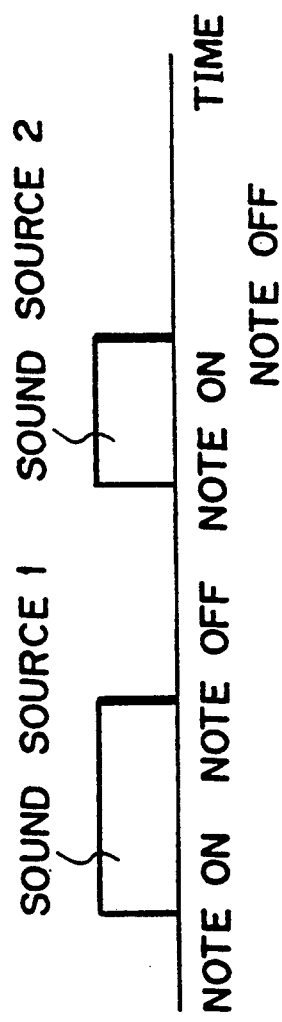

The note on message of the status byte is a command corresponding to the operation that the key of the keyboard is depressed, and is used as a pair with a note off message corresponding to the operation that the key of the keyboard is released. Such a relationship is shown in FIG. 8. The note number of the data byte 1 designates any one of 128 stages assigned to the key with the C of the center being as a center of the 88 key piano. The velocity of the data byte 2 is generally utilized for providing a difference of sound intensity. Responding to the note on message, the MIDI equipment generates a sound of a designated musical scale at a designated intensity. Further, responding to the note off message, the MIDI equipment carries out, e.g., the operation for allowing the key of the keyboard to be released.

Figure 9:
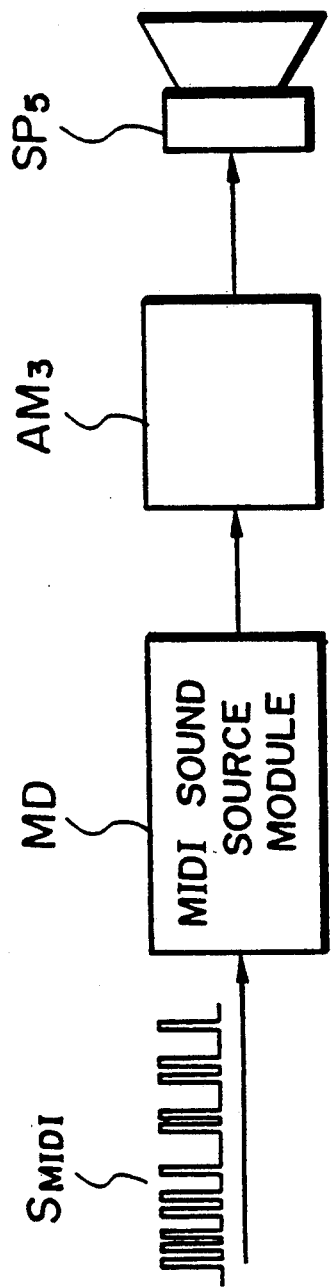

Accordingly, in place of the electronic musical instrument, as shown in FIG. 9, the MIDI sound source module MD, the amplifier AM3 and the speaker SP5 are used, thereby making it possible to generate an arbitrary musical sound by the MIDI control signal S MIDI.

The musical accompaniment playing format used in the invention described in claim 2 or 3 will now be described with reference to FIG. 10 to 16.

Figure 10:
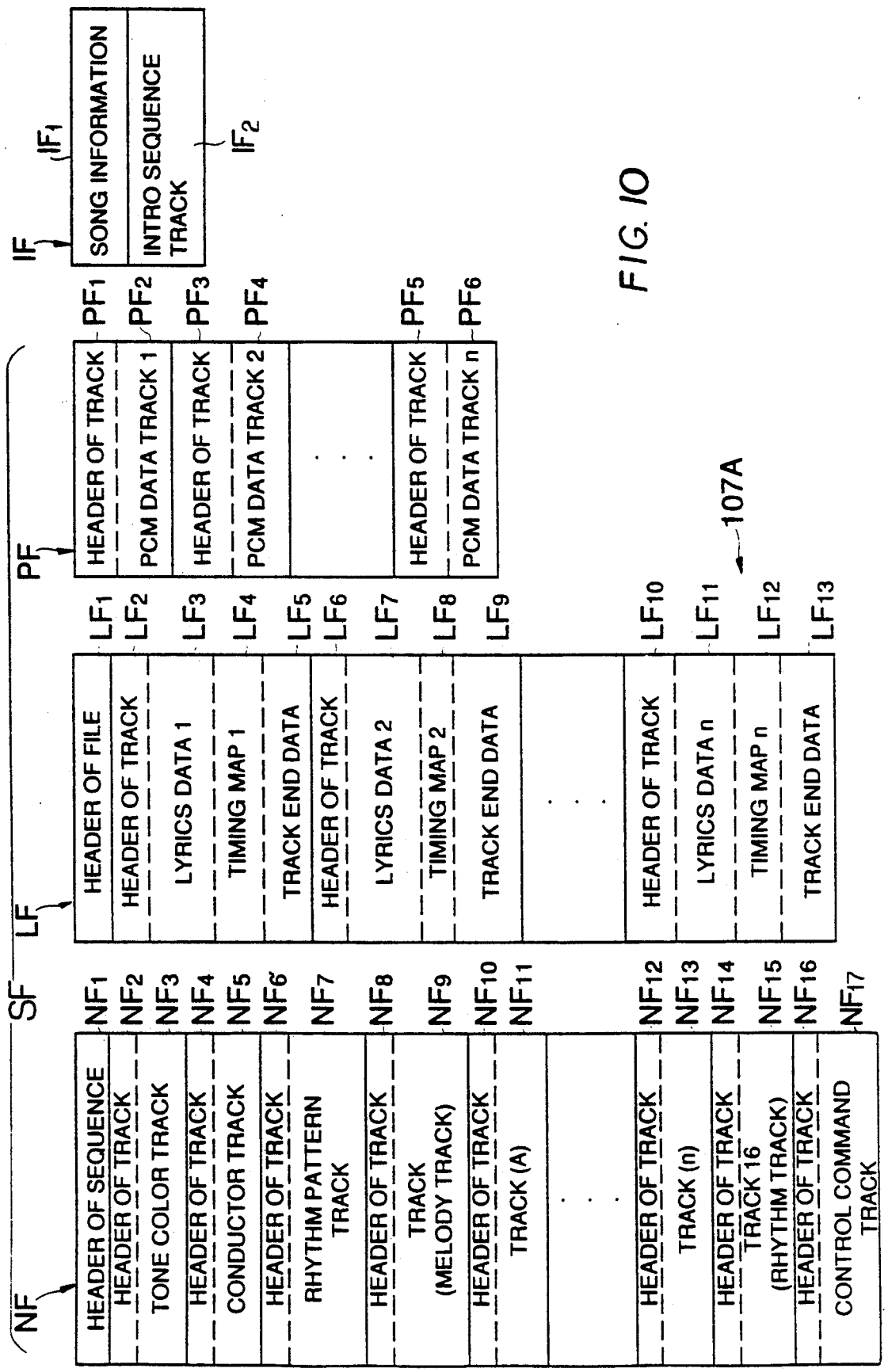
FIG. 10 is a view showing the configuration of the MIDI musical accompaniment playing format used in the present invention.

FIG. 10 shows the data structure of the MIDI accompaniment music playing file stored in an OMD (Optical Memory Disk) serving as the music information recording medium or the musical accompaniment playing information memory medium. The OMD is a writable optical disk used as a memory.

This MIDI accompaniment music playing file format 107A is roughly classified into a sequence file SF and a Table file IF. The sequence file SF is a file required at the time of playing a musical accompaniment, and includes a note file NF serving as a MIDI sound source control information memory area, a lyrics file LF serving as a lyrics information memory area, and a PCM file PF serving as a second musical accompaniment information memory area.

The note file NF is a file in which actual playing data is stored, and includes data areas of NF1 to NF17. Among them, the tone color track NF3 stores data for setting a plurality of tone colors of the MIDI sound source. The conductor track NF5 stores data for setting the rhythm and the tempo. The tempo change, etc. is stored into this data area. The rhythm pattern track NF7 stores pattern data corresponding to one measure of the rhythm in relation to rhythm. NF8 to NF15 are called a note track. For this purpose, 16 tracks can be used at the maximum. Data for the MIDI sound source playing are stored therein. The track 9 NF9 is a track exclusive for melody. The track 16 NF15 is a track exclusive for rhythm. The track numbers a to n are 2 to 15. In addition, the control command track NF16 and F17 stores various control commands such as illumination control or LVD player control, etc..

The data structure of the track header section NF16 and the control command track NF17 is shown in FIG. 11. The track header section NF16 is comprised of only track length data. The track length data includes status byte NF61 and data byte NF62. The status byte NF61 is FFh (h:hexa decimal digit). The data byte NF62 includes four bytes of 00h, 00h, 00h and 00h. Further, various control commands are stored into the area of control command data NF71. For the control command, there are commands, e.g., for illumination performance, image performance, laser video control, and effector control etc.. The respective data specifications are as follows. In the case of the illumination performance control, there are included status byte F1h and data byte. In the case of the image performance control, there are included status byte F2h and data byte. Further, in the case of the laser control, there are included status byte F4h and data byte. This laser video control command corresponds to the image control information, and is composed of, e.g., F3h, AAh, BBh, CCh, . . . . Here, AAh represents a disk No., BBh a reproducing surface (surface A, surface B), and CCh a chapter No. or an image No. In addition, track end data NF72 is such that the status byte is FEh and the data byte is FEh.

The lyrics file LF is a file for storing data of lyrics Telop displayed on a monitor television, and includes data areas of LF1 to LF13. Among them, data of the lyrics themselves are stored into the LF3, LF7 and LF11. Further, data relating to the display timing of the lyrics and the color change speed (scroll) are stored into LF4, LF8 and LF12.

Figure 12A:
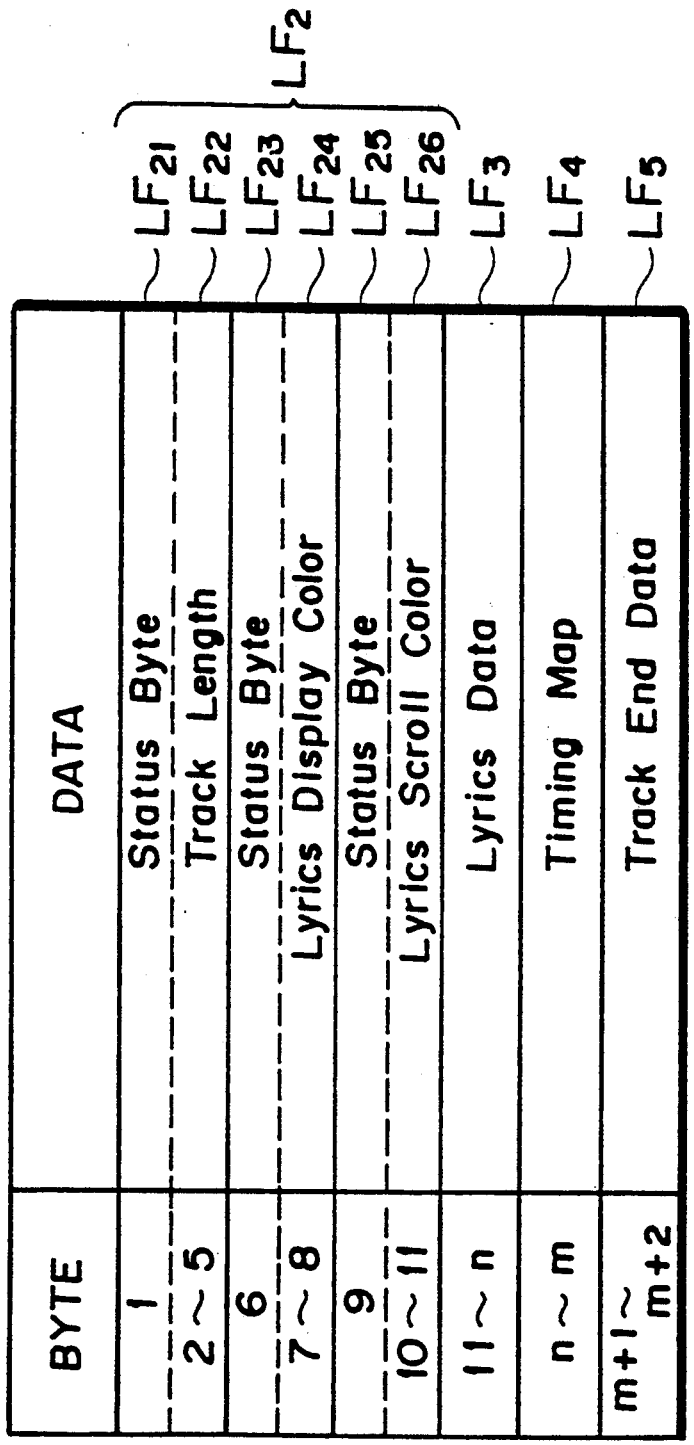

The further detailed structure of the lyrics file LF is shown in FIG. 12(A). FIG. 12 shows the example of LF2 to LF 5.

The track header section LF2 is a data area for storing data for designating a track length, an initial value of the lyrics Telop display color, and an initial value of the lyrics Telop scroll color, and includes data LF21 to LF26. It is to be noted that data of the lyrics Telop display color and the lyrics Telop scroll color may be omitted. In this case, data are set to a predetermined initial value (default value) by the control unit.

Figure 12B:
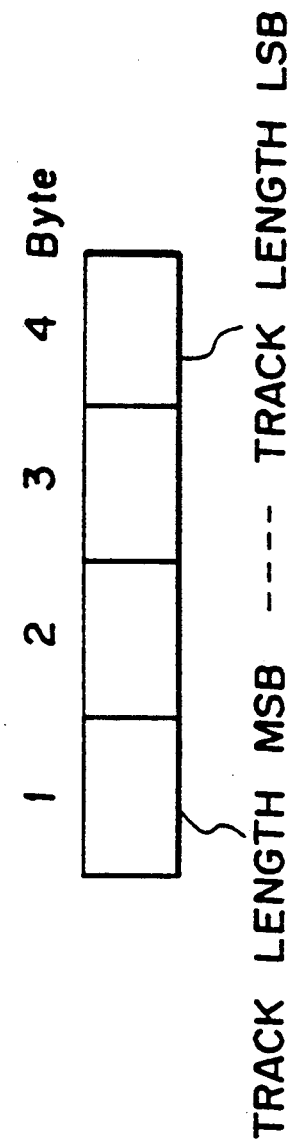

The status LF21 of the track length is one byte (FFh, h:hexadecimal digit), and the track length data LF22 is four bytes as shown in FIG. 12(B). The data of LF22 is stored from the high order byte (MSB) of the track length from the first byte.

Figure 12C:
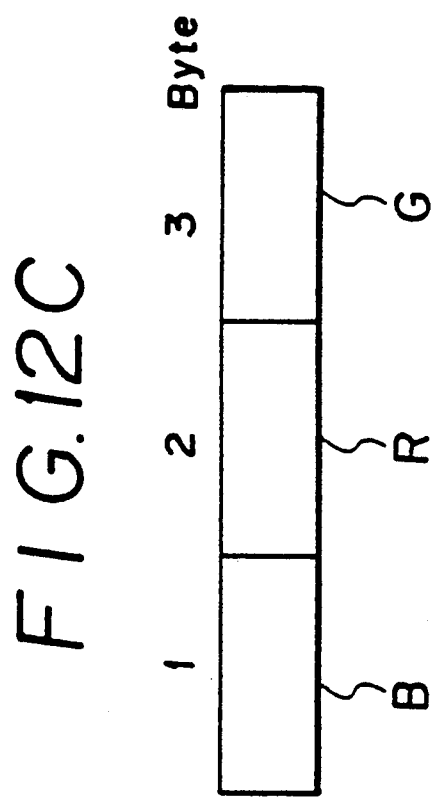

The status LF23 of the lyrics display color is one byte (AOh), and the lyrics display color data LF24 is three bytes as shown in FIG. 12(C). The display color of the lyrics Telop is designated by B(blue), R(red) and G(green). The first, second and third byte of the data bytes correspond to B(blue), R(red) and G(green), respectively, and are designated in the range of OOh to OFh.

The status LF25 of the scroll color is one byte (BOh), and the scroll color data LF26 is three bytes. The specification of the data byte is the same as in the case of the lyrics display color.

An example of the color code by B, R and G is shown in FIG. 13. The lyrics data is stored in the form of the JIS code.

The status of the lyrics data LF3 is COh and the lyrics data succeeding to the status COh is displayed as the lyrics data by one frame. Further, lyrics train numbers are assigned to the lyrics data train succeeding to the status COh in order from 1. In addition, the status and the data of the data end are EOh.

In the data of the timing map LF4, there are included the lyrics Telop display timing, the lyrics Telop erase timing, the lyrics display color, the scroll color, the scroll map data, and the map end.

The status of the lyrics Telop display timing is DFh, and the data is three bytes of [Display Timing] and [Lyrics Number].

At the timing of [Display Timing], the lyrics of the [Lyrics Number] are displayed. With respect to the display timing, the first byte and the second byte of data are stored into the area of the high order byte of timing and the area of the low order byte of timing in order recited.

The status 2 of the lyrics erase timing is DOh, and the data is two bytes of [Off Timing]. The first and second bytes of data correspond to the high order byte of timing and the low order byte of timing, respectively.

The status of the lyrics display color is AOh, and data is three bytes of [Display Color]. The data format is the same as the format of the lyrics display color in the track header. It is to be noted that the lyric display color timing must be subsequent to the display timing of the lyrics Telop display timing.

The status of the scroll color is BOh, and data is three bytes of [Scroll Color]. The data format is the same as the format of the scroll color in the track header. In the timing map, the scroll color timing must be preceding to the scroll map data.

The status of the scroll map data is COh, and data is two bytes of [Scroll Speed] and [Lyrics Count]. The number of characters of [Lyrics Speed] is scrolled at a speed of the musical note of [Scroll Speed] per each character.

The status of the map end is EOh, and the data is EOh.

Further, the status of the track end is FEh, and the data is FEh.

Further, data of two languages or more, or a parody of a song, etc. can be stored into the areas of LF6 to LF13. It is to be noted that such data are not stored when they are not used.

The PCM file PF is a file in which data of sound effect or back chorus, etc. that cannot be generated by the MIDI sound source is stored, and includes data areas of PF1 to PF6. As the method of storing data, various methods such as the PCM (Pulse Code Modulation) method or the ADPCM (Adaptive Differential Pulse Code Modulation), etc. can be adopted.

Figure 14:
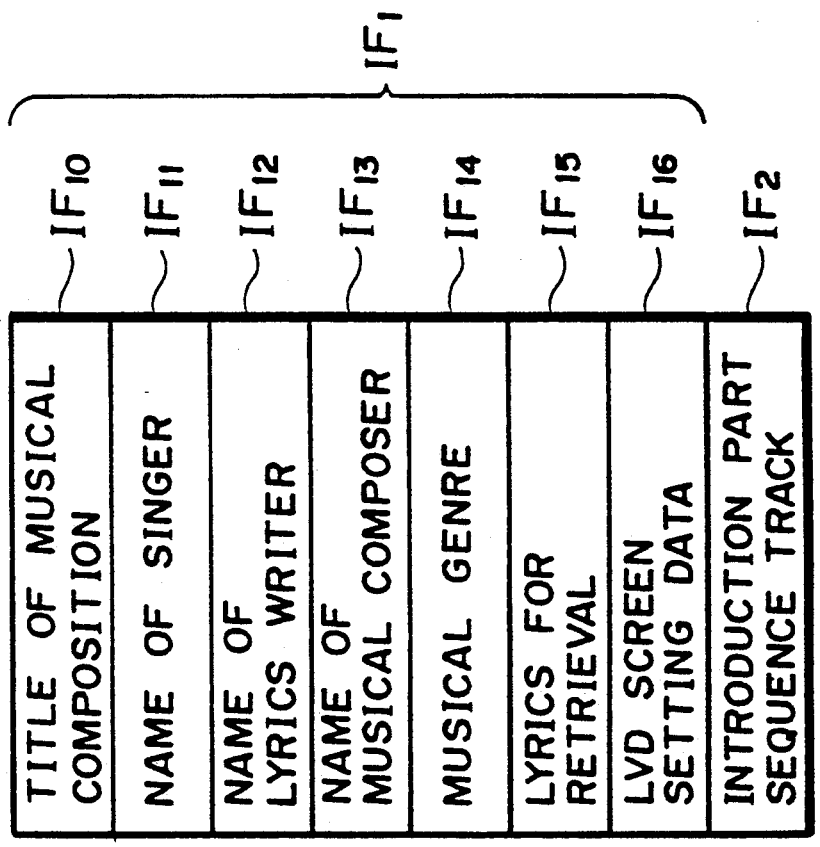
FIG. 14 is a view showing the configuration of the Table file.

The Table file IF is a file for retrieval, and includes IF1 and IF2. In the information file IF1, there are included the title of a musical composition, the name of a singer, the name of a lyric writer, the name of a musical composer, genre of a music, lyrics inserted, LVD screen setting data, etc. On the introduction sequence track IF2, sequence data for allowing the MIDI sound source to play one phrase of a music is stored. An example of the detailed configuration of the Table file IF is shown in FIG. 14.

Further, the example where an image of these retrieval data is displayed as Table is shown in FIG. 15.

FIG. 16 shows an example of an image displayed in the case of the displaying the reservation state by making use of this Table data.

First embodiment

A first embodiment in which an example of the image information memory medium according to the invention described in claim 2 is disclosed will now be described with reference to FIG. 4.

Figure 4:
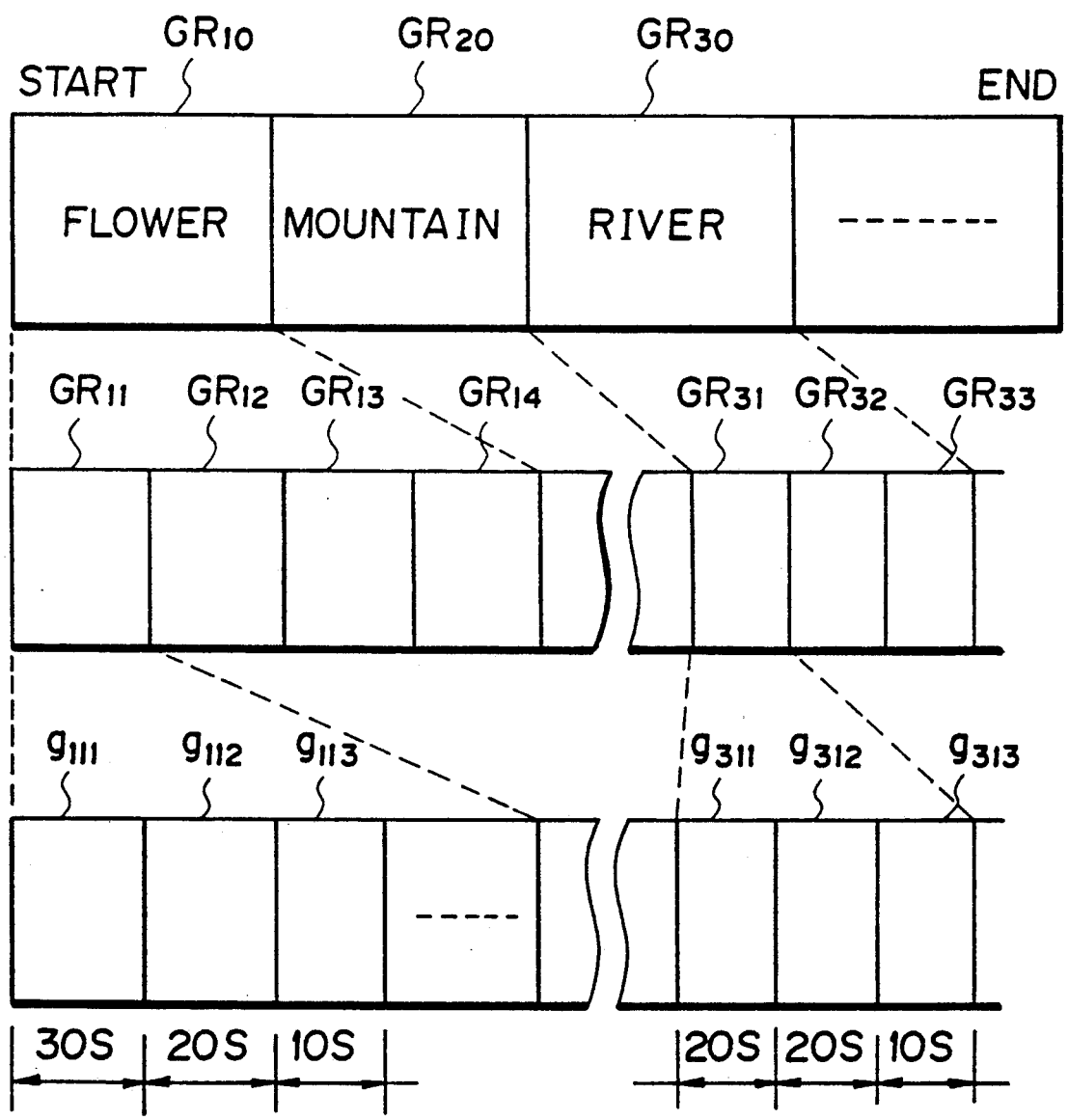
FIG. 4 is a view showing the configuration of a laser video disk which is a first embodiment of the present invention.

This laser video disk LD includes, as shown in FIG. 4, large group image areas GR10, GR20, GR30, . . . . In the large group image area, for example, an image relating to flower, an image relating to mountain, an image relating to river, and the like are recorded. This large group image area includes medium group image area GR11, . . . , GR21, . . . , GR31, . . . For example, in the medium group image area of flower, an image of flower in spring, an image of flower in summer, an image of flower of autumn, an image of flower in winter, and the like are recorded.

Further, the medium group image area includes small group image area g111, . . . , g211, . . . g311, . . . . The small group image area corresponds to the image information segment memory area. For example, in the small group image area of flower in spring, moving pictorial images every several seconds, or several ten seconds such as cherry blossoms, dandelion, or rape blossoms, etc. are recorded. These individual images correspond to image information segments. For the image information segment, there are a moving image information segment relating to the moving picture and a still image information segment relating to the still image. The image information segment includes the above mentioned both information segments. In these large, medium and small group image areas, chapter No. or frame No. (not shown) are recorded. This corresponds to the retrieval address information segment.

A laser video disk of which content is classified by the large group such as flower, mountain, river, . . . or an actual group such as sunflower, Mount Fuji, and recorded in a manner divided into moving pictures (element images) of about several seconds to one minute is searched and reproduced during reproduction of the musical accompaniment on the basis of a video control signal in harmony with the content and/or atmosphere of a song included in the MIDI musical accompaniment data by using a laser video disk player capable of effecting a high speed search having a search time of several times below decimal or less even at the maximum. During the search operation, a final frame immediately before is stored into the memory unit to connect images while reproducing still pictures to reproduce moving pictures until completion of music. At this time, the control signal may be data indicating an actual image, or may be assumed to be large group data to select an image at random to reproduce it. By employing such a scheme, different images may be allocated to the same music. Further, if the search speed is high, still picture during search operation may omitted by making use of the after image effect of the eye. As stated above, with respect to the circumstances where measures could be taken only by the still picture, even if less volume of moving picture softwares or less number of laser video disks are used, it is possible to prepare background moving pictures individually or at random corresponding to many musics without break, or in a manner that user is hardly anxious about breaks.

Second embodiment

A second embodiment in which there is disclosed an image reproducing apparatus or a musical accompaniment playing apparatus according to the present invention described in claim 1 or 6 will now be described with reference to FIG. 5 and 6.

Figure 5B:
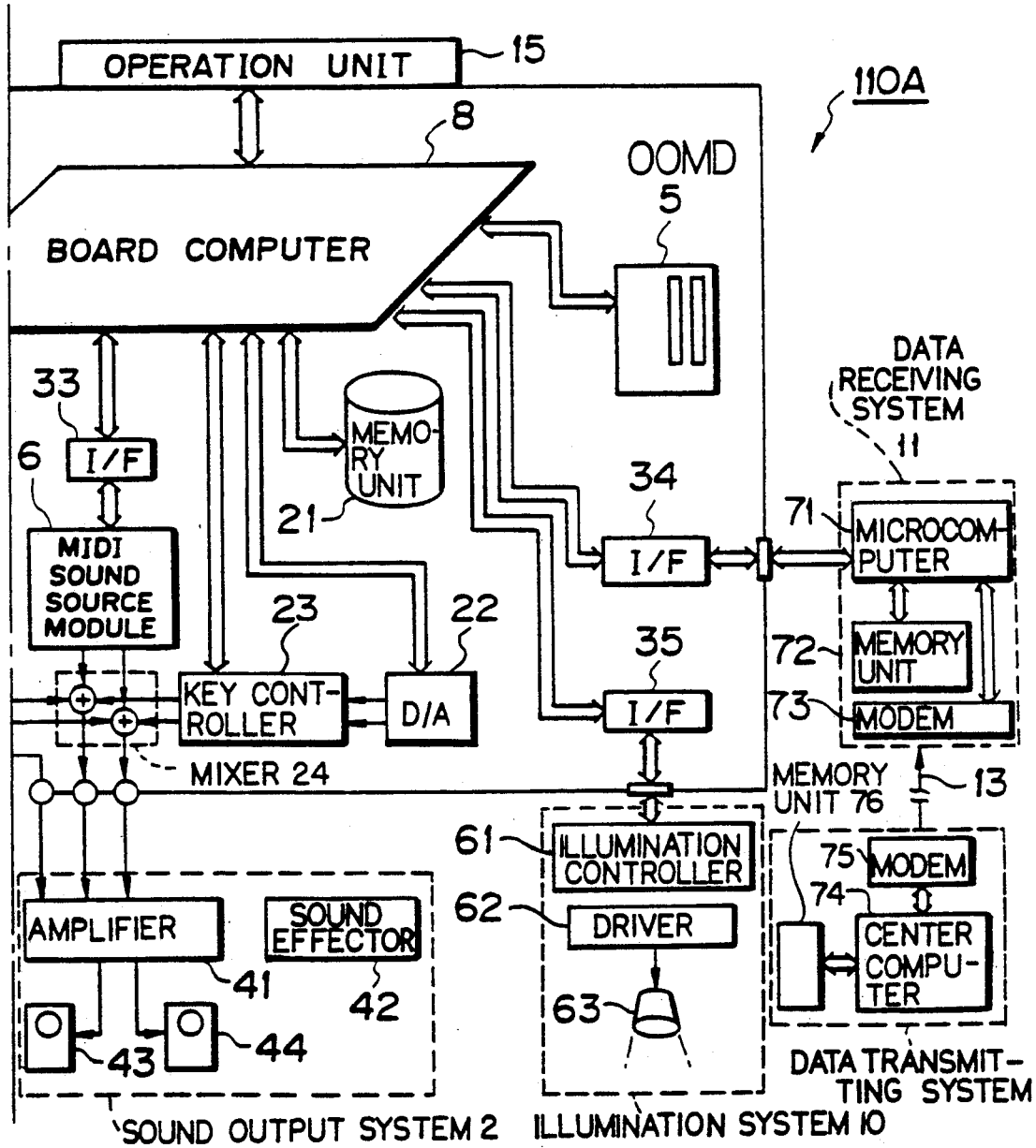
FIG. 5 is a view showing the configuration of a MIDI musical accompaniment playing apparatus which is a second embodiment of the present invention.
Figure 6:
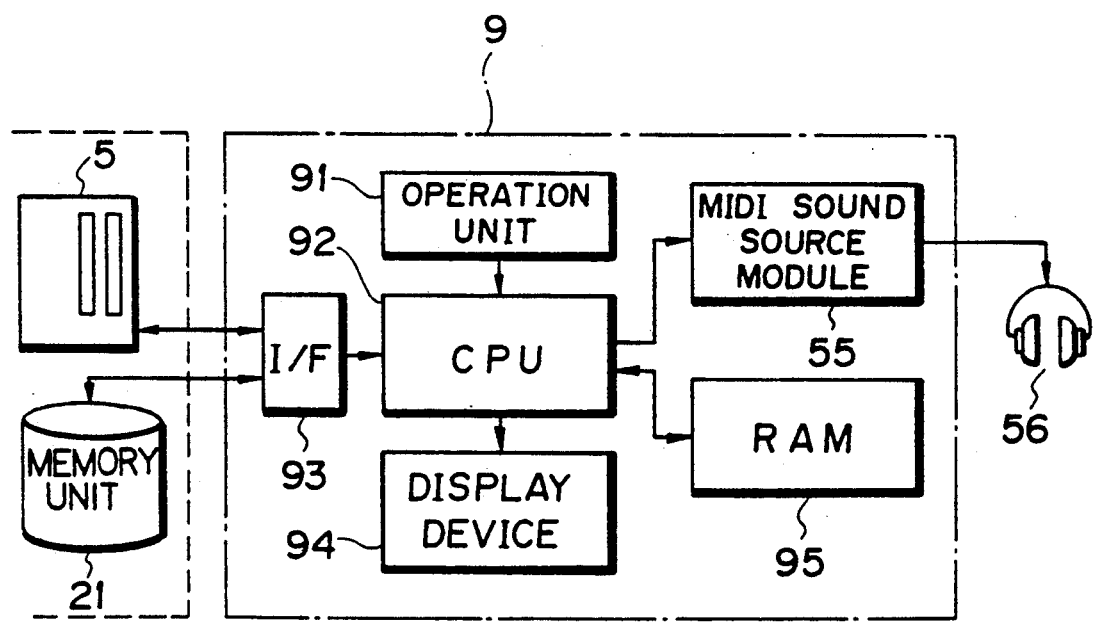
FIG. 6 is a view showing the configuration customer's seat terminal in FIG. 5, FIGS. 7, 8 and 9 are views for explaining the MIDI standard and the MIDI sound source.

This MIDI musical accompaniment playing apparatus 110A roughly comprises, as shown in FIG. 5, a MIDI control unit 1, a sound output system 2, an image display system 3, a microphone 4 serving as the acoustoelectric conversion means, an illumination system 10, and a Table system 14. As the additional system, there are a data receiving system 11, and a data transmitting system 12 connected to the data receiving system 11 through a telephone line 13.

More particularly, the MIDI control unit 1 comprises an OMDD (Optical Memory Disk Drive) 5 serving as the musical information reproducing means or the musical accompaniment playing information reproducing means for writing or reproducing information by using an OMD (not shown) serving as the musical information memory medium or the musical accompaniment playing information memory medium, a MIDI sound source module 6 serving as the MIDI sound source means, a board computer 8 serving as the control means, an operation unit 15, a memory unit 21 such as a hard disk, etc. for storing the control program, etc. of the board computer 8, a D/A converter 22, a key controller 23, a mixer 24, a superimpose circuit 25, a video signal processing circuit 26, a power supply 27, a power switch 28, and interfaces 29, 30, 31, 32, 33, 34 and 35.

Further, the sound output system 2 comprises an amplifier 41, a sound effector 42, and speakers 43 and 44. Here, the sound output system 2 constitutes the sound output means. In addition, the mixer 24 constitutes the mixing means.

The image display system 3 comprises a LVD player 7, an image effector 51, a video camera 52, a customer display 53, a display 54 for reservation, and a display 57 for a singer. Here, the LVD player constitutes the image information reproducing means, and the image display system 3 constitutes the image display means.

The Table system 14 includes a customer's seat terminal 9 for customers, a MIDI sound source module 55, and a head phone 56.

The illumination system 10 comprises an illumination controller 61, a driver 62 and an illumination unit 63.

The data receiving system 11 comprises a microcomputer 71, a memory unit 72 and a modem 73.

The data transmitting system 12 comprises a center computer 74, a modem 75 and a memory unit 76.

The configuration of the customer terminal 9 will now be described with reference to FIG. 6. The customer terminal 9 comprises, as shown, an operation unit 91, a CPU 92, an interface 93, a display device 94, and a RAM 95.

The operation at the time of playing of the MIDI musical accompaniment playing apparatus 110A will now be described.

The Table file IF of the MIDI musical accompaniment playing data is transmitted to a RAM (not shown) in the board computer 8 when the system is powered. The Table file IF is retrieved by operating the control unit 15 to request a song that a singer desires to sing. The board computer 8 responds to the request to read, from the OMDD 5, data (note file NF, lyrics file LF, PCM file PF) of a corresponding music in the sequential file, thus to store it into the RAM in the board computer 8. As the music data, there are a note file NF (including image select data) transmitted to the MIDI sound source module 6, a lyrics file LF transmitted to the superimpose circuit 25, and a PCM file PF transmitted to the D/A converter 22.

Then, a command is transmitted to the LVD player 7 to allow it to search the background image designated as data in the Table file IF, thus causing the LVD player 7 to play a music. At the same time that image appears, musical performance begins. The board computer 8 reads out, from the RAM, note file data NF to transform it to a MIDI signal to transmit that signal to the MIDI sound source module 6. Then, a voice signal from the MIDI sound source module 6 is transmitted to the mixer 24. In synchronism with this, PCM file data PF is read out. The data thus read out is transmitted to the D/A converter 22. The D/A converter 22 converts that data to an analog voice signal to transmit it to the mixer 24, at which two signals are mixed.

The mixed signal thus obtained is delivered to the amplifier 41. Thus, sound is produced from the speakers 43 and 44. At the amplifier 41, a voice signal from the microphone 4 is mixed with the above mentioned signal to produce sound from speakers 43 and 44. The board computer 8 reads out lyrics file data LF in synchronism with output of the MIDI signal and the PCM signal relating to voice to convert it to a character signal to deliver that character signal to the superimpose circuit 25. The superimpose circuit 25 superimposes the character signal on a video signal in which element images sent from the LVD player 7 are connected to send it to the display 57 for singer. A singer sings a song with a microphone 4 in his or her hand while looking at the display 57 and the lyrics thereon. The video signal obtained by connecting together element images sent from the LVD player 7 is separately delivered also to the customer's display through the image effector 51, and is then displayed thereon. The synthetic image from these element images is constructed by a method comprising the steps of reproducing an element image for 10 seconds to allow it to be a still picture at the final frame, and making search operation during that time period to reproduce a next image. Information of the still picture during search operation is sent from a VRAM, etc. (not shown) in the LVD player 7.

Further, an approach may be employed to generate a key control signal from a signal generator (not shown) provided in the microphone 4 so as to become in correspondence with the pitch of a singer to send the MIDI signal and the PCM signal of which keys are changed in correspondence with change of the key at the control unit board computer 8, thereby making it possible to change the key of sound.

The operation relating to the data communication of the musical accompaniment playing apparatus 110A will now be described.

In the existing apparatuses in the form of LVD and CD, delivery of new musics is carried out by delivering disks. However, in the MIDI musical accompaniment playing system, since the music is not in the form of disk, but in the form of data, it is possible to deliver it by making use of the data communication. The configuration therefor is roughly classified into data receiving system 11 and data transmitting system 12 on the delivery side, which are added to the MIDI musical accompaniment playing apparatus 110A serving as the basic system.

The communication is carried out in accordance with a predetermined protocol. In the data communication system 12, the center computer 74 carries out supervisory control of the entirety thereof. This center computer 74 read thereinto MIDI musical accompaniment playing data stored in the memory unit 76 to send it to the data receiving system 11 in accordance with the above mentioned communication protocol through the modem 75. On the other hand, on the data receiving system 11 side, the microcomputer 71 carries out supervisory control of the entirety thereof to receive data through the modem 73 in accordance with the above mentioned communication protocol to temporarily store it into the memory unit 72. When all data have been transferred, communication is completed in accordance with the protocol. When the board computer 8 is not busy, data temporarily stored into the memory unit 72 is transferred to the OMDD 5 through the microcomputer 71, the interface 34, and the board computer 8, and is stored thereat. In this way, delivery of new musics is carried out.

The board computer 8 controls the illumination system 10 on the basis of illumination control data in the note file NF, thus making it possible to provide atmosphere in harmony with the feeling of the music during playing of the musical accompaniment.

Further, in the case where a plurality of lyrics data are included in the lyrics file LF (for example, in the case of lyrics of two languages or more), one lyric (for example, lyric of the Japanese) is ordinarily displayed. If a singer selects another lyric by making use of the operation unit 15 depending upon his or her preference, alteration of musics is ready to be changed at any time from that time point. For example, an alteration from the Japanese to the English, and to the Japanese for a second time may be carried out, or lyrics of the Japanese and the English may be displayed at the same time. In the lyrics data, data of display color and/or display timing, etc. are also included.

Namely, in the case of a song where a plurality of lyrics are present with respect to one music, a singer can freely select a desired lyric. Further, musical accompaniment playing data for the foreign language and that for the Japanese may be commonly used. In addition, performance corresponding to the preference of a singer such as duet together with a foreigner or singing a part to be sung in a chastened or practiced voice in English may be conducted.

In addition, not only lyrics of two languages but also a parody of song may be similarly displayed.

The operation relating to the Table system 14 will now be described with reference to FIG. 6.

The Table file IF is stored into RAM 95 by the OMDD5 of the MIDI control unit 1 when the system is powered. Since the Table file IF exists per each music, Table files corresponding to the number of songs stored in the OMDD 5 within the MIDI control unit 1 are stored into the RAM 95.

Thus, retrieval of musics can be conducted in dependency upon the title of a musical composition, the name of a singer, the name of a lyric writer, the name of a musical composer, and genre, etc. Further, by transmitting sequence data of a retrieved music to the MIDI sound source module 55, a user can hear the introduction part (or a portion in the middle of a music).

Further, in the case where reservation of a music is given, reservation data is temporarily stored into the memory unit 21 in the MIDI control unit 1. Then, data of the name of a musical composition, the name of a singer and the order of reservation, or a person who makes reservation are read out in addition to data of the number of the music, and are changed to character data. Those character data are displayed on a display. Thus, a user can understand at a glance the order of playing of a song that the user has reserved, or whether or not a song that the user wants to sing is already reserved, etc., which could not be grasped by conventional musical accompaniment players.

While explanation has been given in the above described embodiment in connection with the example where writable OMD is used as the musical accompaniment playing information memory medium, such a medium is not necessarily required to be writable. For example, ordinary CDs, CD ROMs, semiconductor memories, IC cards, magnetic memories, or photomagnetic disks, etc. may be used for this purpose.

In addition, in the above described embodiment, a laser video control command serving as the image control information may be inputted or modified from the external by the operation unit.

As described above, in accordance with the present invention, it is possible to display a background image in conformity with the content of a musical accompaniment and free from banality. This is advantageous to providing atmosphere of music.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing apparatus for reproducing musical accompaniment information and image information for music pieces comprising:
   a music information reproducer for reproducing musical information including musical accompaniment information and lyrics information from a music information recording medium on which said musical accompaniment information and said lyrics information relating to a plurality of music pieces are recorded; and
   an image information reproducer for reproducing moving image information corresponding to the music information, in synchronous with said music information, from image information recording media on which moving picture information divided into a plurality of moving picture information segments is recorded, said image information reproducer successively retrieving said moving picture information segments in one of reproduction orders determined in correspondence with the respective music pieces in said music information recording medium and successively reproducing said retrieved moving picture information segments so as to form successive image.

2. An apparatus according to claim 1, wherein said image information reproducer continuously reproduces a first moving picture information segment until a next moving picture information segment succeeding to the first moving picture information segment is retrieved and reproduced.

3. A method for reproducing music information and image information for music pieces comprising the steps of:

reproducing music information including musical accompaniment information and lyrics information from a music information recording medium on which said musical accompaniment information and said lyrics information relating to a plurality of music pieces are recorded;

successively retrieving moving picture information segments, from a image information recording media on which moving picture information divided into a plurality of moving picture information segments is recorded, in one of reproduction orders determined in correspondence with the respective music pieces in said music information recording medium; and successively reproducing said retrieved moving picture information segments so as to form successive image.

4. An information reproducing apparatus for synchronously reproducing musical accompaniment information and image information for music pieces, comprising:

musical accompaniment information reproducing means for reproducing musical accompaniment information from a music information recording medium on which musical accompaniment information for a plurality of music pieces are recorded; and image information reproducing means for reproducing moving image information, in synchronous with the musical accompaniment information, from an image information recording medium on which image information comprised of a plurality of moving picture information segments is recorded, wherein said image information reproducing means successively retrieves and reproduces the moving picture information segments, in accordance with one of a plurality of reproduction control information each determined in correspondence with the respective music information pieces, so as to form successive images, said reproduction control information comprising information relating to the reproduction order of the moving picture information segments.

5. An apparatus according to claim 4, wherein lyrics information and still image information are further recorded on the music information recording medium.

6. An apparatus according to claim 4, wherein said control information is recorded on said music information recording medium.

7. An apparatus according to claim 4, wherein said control information further comprising selection information for selecting a plurality of the moving picture information segments to be reproduced.

8. An apparatus according to claim 4, wherein said image information reproducing means continuously reproduce a first moving picture information segment until a next moving picture information segment succeeding to the first moving picture information segment is retrieved and reproduced.

9. An information reproducing apparatus according to claim 4, wherein said picture information segment comprises still picture information segment.

10. An apparatus for reproducing musical accompaniment information and image information for music pieces comprising:

MIDI sound source means for generating musical accompaniment control information in conformity with a MIDI standard from a musical accompaniment information recording medium on which MIDI sound source control information for music pieces are recorded;

musical accompaniment information reproducing means for reproducing musical accompaniment information in accordance with said MIDI sound source control information;

an acoustoelectric transducer for transforming a voice sung by a singer to an electric signal to be outputted as voice information;

mixing means for mixing the musical accompaniment information and the voice information to be outputted as mixed musical information;

sound output means for transforming the mixed musical information to sound to be outputted;

image information reproducing means for reproducing image information from an image information recording medium on which image information comprised of a plurality of picture information segments are recorded; and control means for controlling the output timing of the image reproduced by said image information reproducing means to be synchronous with the sound outputted from said sound output means, wherein said image information reproducing means retrieves and reproduces the picture information segments in accordance with one of a plurality of reproduction control information determined in correspondence with the respective music piece, said reproduction control information comprises information relating to sets of the picture information segments and reproduction order of the set of the picture information segments corresponding to the respective music pieces.

11. An apparatus according to claim 10, wherein said image information reproducing means reproduce an image of a first picture information segment, as a still image, until a picture information segment succeeding to said first picture information segment is retrieved and reproduced.

12. An information reproducing method for reproducing musical accompaniment information, lyrics information and picture information for music pieces from information recording media on which said musical accompaniment information, said lyrics information and said picture information are recorded, said method comprising the steps of:

selecting one of the music pieces to be reproduced;

selecting one of the sets of picture information segments determined in correspondence with the selected music piece, and successively reproducing said moving picture information segments of the selected set, in one of a plurality of reproduction orders determined in correspondence with the selected music piece, so as to form successive image.

* * * * *